April 13, 1943.    J. W. PARKER    2,316,449
BEARING
Filed May 31, 1941
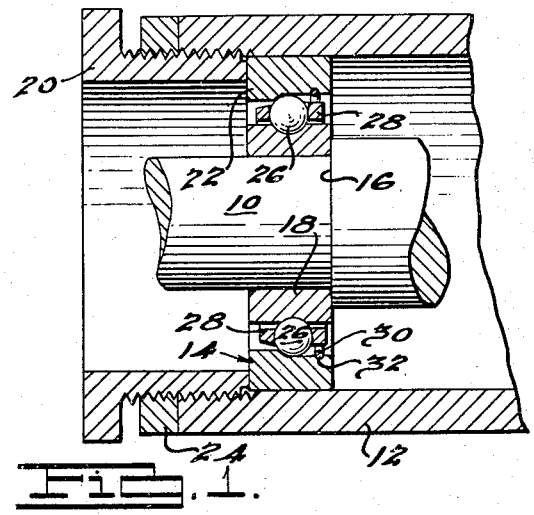
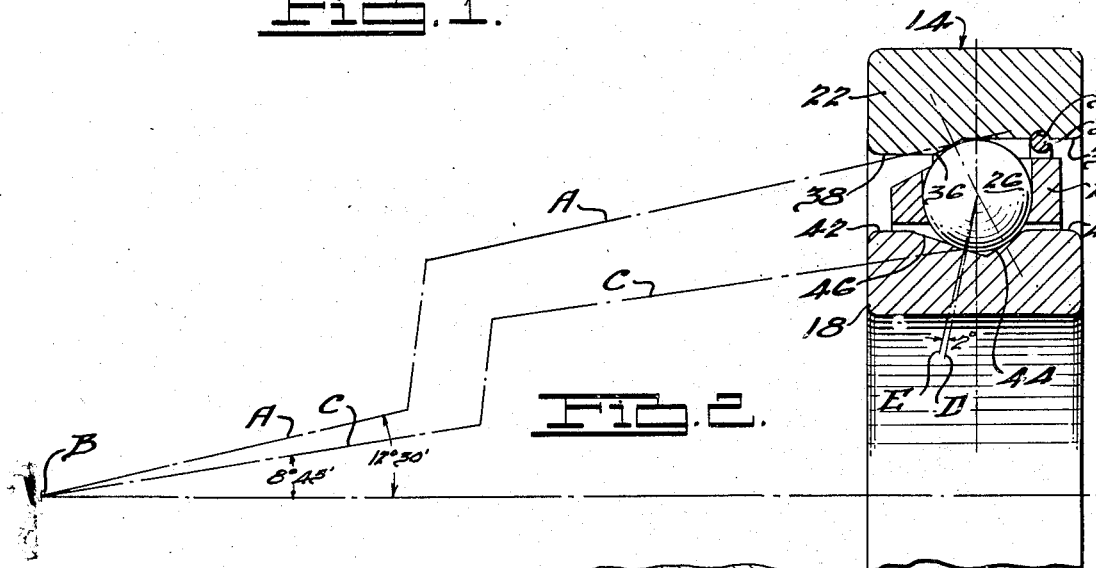
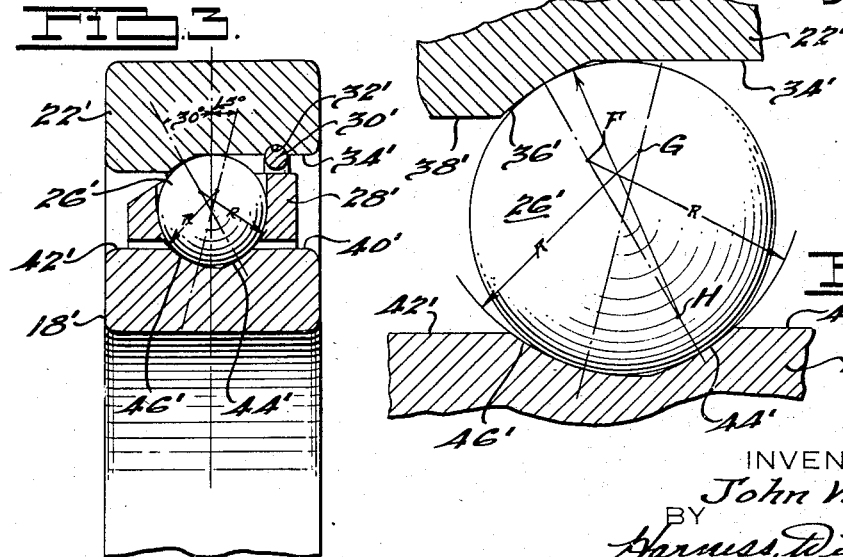
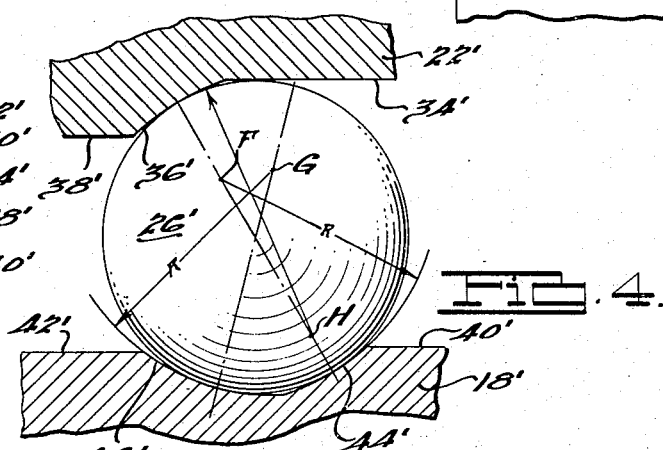
INVENTOR
John W. Parker.
BY
Harness, Dickey & Pierce.
ATTORNEYS.

Patented Apr. 13, 1943

2,316,449

UNITED STATES PATENT OFFICE 2,316,449

BEARING

John W. Parker, Detroit, Mich.

Application May 31, 1941, Serial No. 396,042

4 Claims. (Cl. 308—195)

This invention relates to bearings and particularly to ball bearings adapted for use on high speed shafts, the principal object being the provision of a bearing of the type described that is simple in construction, that will remain continually efficient and chatter proof in operation, and involves a minimum of parts.

Objects of the invention include the provision of a bearing including one-piece inner and outer race members and a row of balls arranged between them, the balls each having a pair of separate points of contact with both the outer and inner races and the points of contact being so arranged with respect to the balls that the balls will not only roll in a circle about a surface of revolution concentric with the axis of the bearing but will be also caused to rotate in a different direction whereby to eliminate localization of lines of wear between the balls and the races during operation; the provision of a bearing construction including single piece inner and outer race members and a plurality of balls interposed between them and adapted for rolling contact therewith along two lines in each of the races, so constructed and arranged that any wear developing between the balls and the races may be readily compensated for, thereby enabling adjustment of the bearings to eliminate possible chatter therein; the provision of a bearing of the type described in which each ball has two points of contact with both the inner and outer races, the points of contact of any ball with the races being such that a line drawn through the points of contact of the ball with the outer race will intersect the axial line of the bearings at a point adjacent to but spaced from a line drawn through the points of contact of the ball with the inner race, whereby the effect of the ball rolling between the races will be similar to that of a conical bearing but sufficiently different therefrom to create a drag between the ball and one of the races thereby to effect a rotation of the ball in a direction other than about the axis of the race to continually bring new points on the surface of the ball into engagement with the races and prevent localization of the line of wear between the ball and the races.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a fragmentary sectional view taken axially through a portion of a support having a shaft rotatably mounted therein by means of a bearing constructed in accordance with the present invention;

Fig. 2 is an enlarged fragmentary sectional view taken radially through a portion of a bearing constructed in accordance with the present invention more clearly illustrating the details thereof;

Fig. 3 is a view similar to Fig. 2, but illustrating the construction of the bearing as preferably manufactured; and, Fig. 4 is an enlarged fragmentary view of the bearing shown in Fig. 3 better illustrating the relation between one of the balls and the races.

The bearing of the present invention has been particularly designed for use in connection with shafts required to be rotated at high speeds, in many cases under an eccentric load, without chattering. Examples of its use are in connection with the spindles of internal grinders and the spindles for diamond boring machines and the like in which ability to stand up under continuous high speed operations with absolute lack of chatter is essential. The bearing follows the practice of my prior United States Patents No. 1,430,319 and No. 1,886,219 in that the bearing is so constructed and arranged as to provide two points of contact of each ball with both the inner and outer races, the points of contact with these races being so arranged as to cause the ball to roll about a surface of revolution concentric with the axis of the bearing while simultaneously rolling about an axis transverse to the axis of the bearing, this being for the purpose of continuously bringing different points on the surface of the balls into contact with the races thereby to eliminate setting up of lines of wear on the balls through contact with the races, and wearing the ball evenly over its entire surface so as to maintain its spherical condition even though slightly reduced by wear. The constructions illustrated in my prior patents necessitated the employment of at least one race member formed as two separate parts, requiring such parts to be carefully and accurately machined so as to insure proper cooperation with each other in the final product and resulting in a product that is relatively expensive to produce.

Despite the expense of the bearings disclosed in my prior patents, there has been a continued demand for the same in the higher class machine tools requiring extreme accuracy in operation and a high quality of finish on the work being operated upon, but the cost of the same has been such as to restrict the use of the bearings in certain other fields where they would be found of advantage but in which the advantages are not now considered to be sufficient to offset the added cost as compared to conventional types of bearings. Accordingly, the present invention is the result of an attempt to produce a less expensive bearing than those disclosed in my prior patents but nevertheless one which will embody the principal advantages of the bearings of my prior patents. This has been accomplished by so designing the bearing that both the inner and outer races may each be made solid integral race members, thus eliminating one of the race members of my prior constructions and although requiring as great accuracy in their manufacture as the race members of my previous patents, substantially eliminating the cost of one of the race members entirely and eliminating the need of providing any means previously required for associating the two split members with each other. In accomplishing this result, the bearing produced in accordance with the present invention may serve to take thrust only in one direction whereas my prior constructions can take thrust in both directions, but inasmuch as the majority of installations will require thrust to be taken in one direction only, this feature is of little importance in the majority of cases.

Referring to the drawing and particularly to Fig. 1, a rotatable shaft or spindle 10 is illustrated as being rotatably supported in a tubular housing or support 12 by means of a bearing assembly indicated generally at 14 constructed in accordance with the present invention. It will be understood that the righthand end of the shaft 10 will also be supported by a bearing such as 14 or any other suitable type of bearing and preferably such as to limit movement of the shaft 10 in a righthand direction along its axis. The support for the bearing 14 is preferably such as to permit a limited amount of axial adjustment of the outer race with respect to the inner race and although this may be taken care of in any suitable or conventional manner, the construction shown merely by the way of illustration comprises a shoulder 16 on a shaft 10 against which the righthand face of the inner race 18 of the bearing 14 abuts and a collar 20 threaded into the open end of the housing 12 and abutting the lefthand face of the outer race member 22, the collar 20 being locked in axially adjustable position by means of the lock nut 24. The inner and outer races 18 and 22, respectively, receive between them a plurality of balls 26, the various balls being maintained in angularly spaced relation with respect to the axis of the shaft 10 and bearing 14 by means of a cage 28 providing a pocket for each of the balls 26. The cage 28 may be formed of any suitable metal such as bronze, brass, or the like or, if desired, may be formed of suitable non-metallic material such as Bakelite, fiber, plastic, or the like. A split spring ring 30 is contracted and allowed to expand into a groove 32 in the bore of the outer race 22 whereby to provide a stop for engagement with the balls 26 and prevent inadvertent dis-assembly of the bearing, particularly during shipment and the like.

Referring now to Fig. 2, it will be noted that the race member 22 is internally provided with a cylindrical surface 34 shown as extending from one end of the race to a point slightly beyond the center line thereof where it joins with the inwardly directed frusto-conical surface 36 which extends a short distance inwardly and axially therefrom and terminates in such direction at the cylindrical surface 38 which extends to the opposite end of the race and is of a diameter smaller than the diameter of the cylindrical portion 34.

The inner race member 18 is provided on its outer surface and at each end thereof with cylindrical surfaces 40 and 42, respectively, which are spaced from each other axially of the race by a groove formed by the opposed frusto-conical surfaces 44 and 46, respectively.

The balls 26 received between the races 18 and 22 contact the outer race 22 both on the surface 34 and on the surface 36, thus affording two points of contact between the balls and the outer race which points of contact are separated axially of the bearing one from the other. One of these points of contact is, of course, in a plane passing through the axis of the balls 26 and perpendicular to the axis of the race 18, and the other point of contact is axially offset from such plane. The balls 26 also contact the inner race 22 on the surface 44 and on the surface 46, thus affording two points of contact between each ball 26 with the inner race 18 at points on the race spaced axially of the bearing from one another and on opposite sides of the plane above referred to.

Because of the fact the surface 34 is cylindrical or approximately so, it will be understood that a line, such as the line A in Fig. 2, drawn through the points of contact of a ball 26 with the surfaces 34 and 36, respectively, will be inclined towards the left as viewed in Fig. 2 towards the axis of the bearing and will intersect the axis of the bearing at a point such as B, at a distance to the left of the bearing depending upon the angularity of the surface 36 with respect to the axis of the bearing. As a matter of illustration only, I have found that an angularity of the surface 36 such that the line thus drawn through the points of contact of a ball 26 with the outer race 22 will be disposed at an angle of 12 degrees and thirty minutes with respect to the axis of the bearing is suitable for the practice of the present invention, it being understood, however, that this angularity may vary between greater or lesser limits.

Assuming that the line A intersects the axis of the bearing at the point B, it will be appreciated that if a line such as C also intersected the axis of the bearing at the point B and included in its length the points of contact of the balls 26 with both surfaces 44 and 46 of the inner race 18, the balls 26 would have a true rolling motion between the inner and outer races 18 and 22, respectively, about the axis of the bearings, with no slippage whatever occurring and the rolling motion of the balls 26 would be equivalent to the rolling motion of the frusto-conical rolling elements of a tapered rolling bearing. In other words, the effect would be the same as though the balls rolled about a conical surface. However, it will be also appreciated that in such case the consecutive lines of contact between each ball and the inner and outer races during such rolling would be in the form of two rings of constant location on each ball and for this reason the wear between the balls and the races would be localized in such rings and the bearings would be subject to early deterioration because of this fact.

In order to avoid the occurrence of such localized wear on the balls and to insure the balls wearing evenly over their entire surfaces and being maintained in true spherical form, one of the points of contact between each ball and one of the races 18 or 22 is slightly offset from the point of intersection of the lines A or C, respectively, with the surfaces 34 and 38 or 44 and 46, respectively, so as to cause slippage and, therefore, a slight drag at such point of contact which will cause the balls 26 to rotate slowly about an axis lying in a plane transverse to the axis of the bearing while rolling around the races. While any one of these points of intersection may be offset in order to obtain the effect desired in accordance with the present invention, as a matter of illustration only the point of contact of the balls 26 with the surface 46 is shown offset in the manner described.

Still referring to Fig. 2, if the angularity of the surface 46 was such that the point of contact of the ball 26 with such surface fell on the line C, then a line drawn through the center of the ball 26 and through the point of intersection of the line C with such surface (which point of intersection would also lie on the surface of the ball 26) would correspond with the line D. However, with the angularity of the surface 46 as provided in order to avoid true rolling between the ball 26 and the surface 46 under the circumstances assumed in the present case, a line drawn through the center of the ball 26 and through the actual point of contact of the ball 26 with the surface 46 is represented at E, the lines E and D being angularly offset from one another. It makes no difference whether the line E is offset in a clockwise direction or in a counterclockwise direction from the line D as viewed in Fig. 2 as the ultimate effect will be the same in any event, but in the case shown it is offset from the line D in a clockwise direction. The amount which the lines E and D are thus angularly offset from one another may vary between material limits within the spirit of the invention. In other words, the angularity between the lines E and D may vary from an angularity of a few minutes to an angularity of 10 degrees and even greater, the angularity capable of being employed increasing with increased diameter of the balls 26. For balls in the neighborhood of ¼ inch in diameter I have found that an angularity between the lines E and D of 1 to 5 degrees is sufficient to obtain the desired results, although a greater range of angularity is possible. The angularity between these lines in the illustration in Fig. 2 is assumed to be 2 degrees, this amount having proven extremely satisfactory in service.

It will be understood that if the points of contact of the balls 26 with the outer race 22 were both included in the line A and the points of contact of the balls 26 with the inner race 18 were both included in the line C, the rotational axis of each ball in rolling between the races 18 and 22 would lie in the surface of the cone having its apex at B and passing through the centers of the balls 26. By so arranging one of the surfaces 34, 36, 44 and 46 that the point of contact of a ball 26 therewith does not fall in one of the lines A—B but instead is slightly offset therefrom, a tendency is set up by the friction existing between each ball and the race at such offset point of contact, to cause each ball 26 to roll either faster or slower, depending upon the direction of offset, than the speed of rotation of the balls 26 as urged by their frictional contact with the races at the remaining three points of contact. The friction set up between the balls and their races at such three remaining points of contact will overcome to a great degree the drag thus set up by contact of the balls 26 with the aforementioned offset points of contact and cause the balls to slide with respect to the corresponding race at the offset points of contact, so that the general direction of rotation of the various balls 26 will be about axes lying in a conical surface whose apex is at B and which includes the centers of the balls 26, but the slight drag set up between each ball 26 and its offset point of contact will nevertheless create a sufficient drag to cause the balls 26 to also rotate slowly in a clockwise or counterclockwise direction as viewed in Fig. 2, depending upon the direction of offset from the line D.

This gradual or slow rotation of the balls 26 in a clockwise or counterclockwise direction as viewed in Fig. 2 will continuously bring new and seldom repeated points on the surface of the various balls 26 into contact with the races 18 and 22, thus eliminating the possibility of the points of contact of the balls 26 with the races falling in ever repeated circles and thus localizing the wear in such circles. It will be appreciated that this rotation of the balls 26 in two different directions during relative rotation between the races 18 and 22 is such that any wear between the races and balls will serve to wear the balls 26 into true spherical form and this feature is of importance in maintaining the desired accuracy of the bearings through an exceptionally long life as compared to conventional types of bearings. It will also be recognized from this explanation that the greater the amount of offset of one point of contact from a position of true rolling engagement, in other words the greater the angularity between the lines E and D in Fig. 2, the greater the slippage between the balls 26 and the races 18 and 22 and, consequently, the greater will be the possibility of wear. For this reason it will be appreciated that it is desirable to maintain this amount of offset as small as possible without losing the beneficial effect thereof as herein described.

From a manufacturing standpoint, it is more difficult to form a groove in a surface, such as the groove formed by the surfaces 44 and 46, with straight side walls than it is with curved side walls. It will also be appreciated that it makes no difference whether the walls or surfaces which contact the balls 26, shown as the surfaces 34, 36, 44 and 46, respectively, in Fig. 2, are curved or straight diametrical section as long as the points of contact between the balls 26 and these surfaces lie in the relation heretofore explained with respect to the lines A and B. The surfaces 34 and 36 may be formed as straight surfaces in central section as readily as curved surfaces for the reason that the surface 36 lies radially inwardly of the surface 34 and, accordingly, is directly accessible to a tool moving axially thereof. For ease in manufacture, however, the surfaces 44 and 46 are preferably formed as curved surfaces such as illustrated in Figs. 3 and 4. Inasmuch as the construction shown in Figs. 3 and 4 is equivalent to that illustrated in Fig. 2, the outer race member and the inner race member and equivalent surfaces in Figs. 3 and 4 are illustrated by the same numerals as in Fig. 2 except that such numerals bear a prime mark. As illustrated best in Fig. 4, the surface 44', corresponding with the surface 44 previously described, appears in section as a curved surface having its center at F, and the surface 46', corresponding with the surface 46 previously described, appears in section as a curved surface having its center at G. The points of contact of the balls 26 with the surfaces 44' and 46' bear essentially the same relationship, however, as in the case of the surfaces 44 and 46 previously described. The outer race member 22' has a surface 34' identical to the surface 34 in Fig. 2, and a surface 36' equivalent to the surface 36 in Fig. 2, but in this case curved as, for instance, on an arc struck about a center such as H, but contacting the balls 26' on the same points as in the construction shown in Fig. 2. The resulting structure, of course, operates in identically the same manner as that shown and described in connection with Fig. 2.

It will be appreciated that in the bearing construction thus described, if the same is supported as illustrated in Fig. 1 or supported in some equivalent manner permitting axial adjustment of the inner and outer races 18 and 22, respectively, should any wear develop between the balls 26 and the races, proper axial adjustment of the position of the collar 20 will serve to take up such wear and eliminate the effects thereof.

Formal changes may be made in the specific embodiment of the invention described without departing from the spirit or substance of the broad invention, the scope of which is commensurate with the appended claims.

What I claim is:

1. A bearing comprising, in combination, a one-piece inner race member, a one-piece outer race member, and a plurality of balls arranged between said race members, each of said race members being so constructed and arranged as to provide two axially spaced points of contact between it and said balls, said points of contact on one of said race members being disposed on opposite sides of and spaced a substantial distance from a plane including the centers of said balls, one of said points of contact on the other of said races being disposed substantially in said plane, three of said points of contact between said races and said balls being such as to provide a true rolling effect therebetween, and the fourth point of contact between said races and said balls being so located with respect to the remaining three points of contact between the races and the balls as to necessitate a slippage between said balls and said fourth point of contact during true rolling of said balls at the three remaining points of contact.

2. A bearing comprising, in combination, a one piece inner race member, a one piece outer race member, and a plurality of balls received therebetween, said race members being so constructed and arranged as to provide two axially spaced points of contact between each thereof and each of said balls, the two points of contact of said inner race member with each of said balls being disposed on opposite sides of and spaced a substantial distance from a plane including the centers of said balls and one point of contact between each of said balls and the outer of said races being in said plane, said points of contact being so arranged that a line drawn through both points of contact on one race member and one of said balls will intersect the axis of said bearing at an acute angle with respect thereto and a line drawn between the point of intersection of the first mentioned line with the axial line of the bearing and through one of the points of contact of one of said balls and the other of said race members will not include the second point of contact between one of said balls and the last mentioned race member, the last mentioned point of contact being offset axially of the bearing from the adjacent point of intersection of the last mentioned line with said ball.

3. A bearing comprising, in combination, a one piece inner race member, a one piece outer race member, and a plurality of balls received therebetween, said race members being so constructed and arranged as to provide two axially spaced points of contact between each thereof and each of said balls, the two points of contact of said inner race member with each of said balls being disposed on opposite sides of and spaced a substantial distance from a plane including the centers of said balls and one point of contact between each of said balls and the outer of said races being in said plane, said points of contact being so arranged that a line drawn through both points of contact on one race member and one of said balls will intersect the axis of said bearing at an acute angle with respect thereto and a line drawn between the point of intersection of the first mentioned line with the axial line of the bearing and through one of the points of contact of one of said balls and the other of said race members will not include the second point of contact between one of said balls and the last mentioned race member, the last mentioned point of contact being offset axially of the bearing from the adjacent point of intersection of the last mentioned line with said ball, the amount of offset between the last mentioned point of contact and the adjacent point of contact of the last mentioned line with the surface of said ball, measured angularly about the center of said ball, being material but less than 10 degrees.

4. A bearing comprising, in combination, a one piece inner race member, a one piece outer race member, and a plurality of balls received therebetween, said race members being so constructed and arranged as to provide two axially spaced points of contact between each thereof and each of said balls, the two points of contact of one of said race members and each of said balls being disposed on opposite sides of and spaced a substantial distance from a plane including the centers of said balls and one point of contact between each of said balls and the outer of said races being in said plane, said points of contact being so arranged that a line drawn through both points of contact on one race member and one of said balls will intersect the axis of said bearing at an acute angle not materially greater than twelve and one-half degrees with respect thereto and a line drawn between the point of intersection of the first mentioned line with the axial line of the bearing and through one of the points of contact of one of said balls and the other of said race members will not include the second point of contact between one of said balls and the last mentioned race member, the last mentioned point of contact being offset axially of the bearing from the adjacent point of intersection of the last mentioned line with said ball, the amount of offset between the last mentioned point of contact and the adjacent point of contact of the last mentioned line with the surface of said ball, measured angularly about the center of said ball, being approximately 2 degrees.

JOHN W. PARKER.